United States Patent [19]

Kato

[11] 4,214,719
[45] Jul. 29, 1980

[54] TAPE CASSETTE

[75] Inventor: Shinichiro Kato, Sendai, Japan

[73] Assignee: Sony Corporation, Tokyo, Japan

[21] Appl. No.: 11,560

[22] Filed: Feb. 12, 1979

[30] Foreign Application Priority Data

Feb. 17, 1978 [JP] Japan .............................. 53-19111[U]

[51] Int. Cl.² ............................................. B11B 23/10
[52] U.S. Cl. ................................................... 242/198
[58] Field of Search ............. 242/198, 199, 200, 71.2, 242/54.1; 360/96.5, 96.6, 132

[56] References Cited

U.S. PATENT DOCUMENTS

| | | | |
|---|---|---|---|
| 2,209,178 | 7/1940 | Taesler | 242/198 |
| 2,687,259 | 8/1954 | Owens | 242/198 X |
| 3,900,172 | 8/1975 | Kamaya | 242/198 |
| 4,136,843 | 1/1979 | Gourley | 242/198 |

FOREIGN PATENT DOCUMENTS 1444912   8/1976   United Kingdom ..................... 242/198

*Primary Examiner*—George F. Mautz
*Attorney, Agent, or Firm*—Lewis H. Eslinger; Alvin Sinderbrand

[57] ABSTRACT

In a tape cassette for use in a magnetic recording and/or reproducing apparatus and which is of the type having at least one reel contained in a cassette casing formed with an opening through which a tape wound on the reel can be withdrawn from the cassette casing for the recording of signals thereon or reproducing the signals therefrom, tape guide members are arranged at opposite sides of the opening for guiding the tape in a path which extends along the opening, and a brake member provided to prevent the reel from rotating when the tape cassette is not used, an improvement is made wherein at least one tape guide member is integrally formed on the brake member. In one embodiment the tape guide member integrally formed on the brake member is distant from the pivotal axis of the brake member so as to alter the length of the tape path when the brake member is rotated.

11 Claims, 11 Drawing Figures

TAPE CASSETTE

BACKGROUND OF THE INVENTION

1. Field of the Invention

This invention relates to a tape cassette, and more specifically, is directed to a tape cassette for magnetic recording and/or reproducing apparatus.

2. Description of the Prior Art

The conventional tape cassette for magnetic video tape recording and/or reproducing apparatus is, as disclosed, for example, in U.S. Pat. No. 3,900,172, provided with a pair of brake levers which engage respective reels of the cassette to prevent the latters from rotating when the cassette is not used. The brake levers are arranged beside tape guide members which are positioned on both sides of a front opening of the tape cassette. When the magnetic tape is withdrawn from the front opening, the brake levers are released. Thus, the conventional tape cassette requires many parts and hence is rather troublesome to assemble.

Further, in the conventional tape cassette, the tape is pinched between resilient tape-slack preventing members and the tape guide members to prevent the tape from being slackened. But this is not very effective, and tape slack is not entirely eliminated. Thus, the tape is apt to be slackened when the tape cassette is ejected from a video tape recorder (V.T.R.), allowing it to be jammed when a lid for covering the front opening is closed. Tape slackening also causes other troubles.

SUMMARY OF THE INVENTION

One object of this invention is to provide a tape cassette, with a reduced number of parts.

Another object of this invention is to provide a tape cassette which can be easily assembled.

A further object of this invention is to provide a tape cassette which prevents its tape from being slackened.

A still further object of this invention is to provide a tape cassette which reduces the slackness in its tape when the cassette is ejected from a V.T.R.

According to one aspect of the present invention, an improvement is made in a tape cassette of the type including a cassette casing, at least one tape reel arranged inside the casing, a length of tape wound on the tape reel, an opening formed on the casing, at least two tape guide members, one arranged on each side of the opening for guiding the length of tape along a tape path which extends along the opening, and a brake member engaged with the tape reel to prevent the tape reel from rotating when the cassette is not used. The tape cassette is improved in that at least one of the tape guide members and one of the brake members are formed as one body and that one body functions both as a tape guide member and as a brake member.

The above and other objects, features and advantages of this invention will be apparent from the following detailed description of illustrative embodiments thereof, which are to be read in connection with the accompanying drawings.

DESCRIPTION OF THE PREFERRED EMBODIMENTS

Before proceeding with a detailed description of several embodiments of this invention, an example of a conventional tape cassette to which this invention may be applied will be described for the purpose of clearly contrasting this invention from that which came before it.

Figure 1:
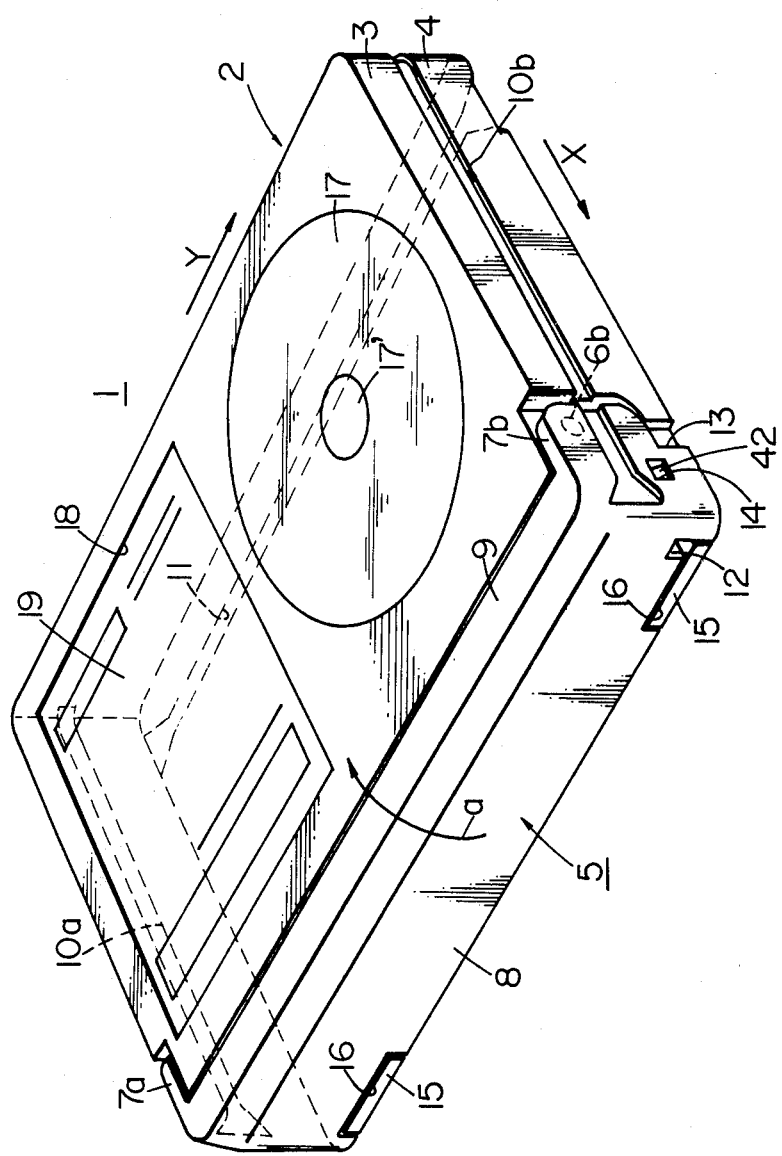
FIG. 1 is a perspective view of a tape cassette to which this invention may be applied.

The tape cassette 1 used on a V.T.R. has the shape of a flat rectangular parallelopiped, as shown in FIG. 1, and has a cassette casing 2 which consists of an upper half section 3 and a lower half section 4, both moulded of strong synthetic resin, for example, A.B.S. resin. In the casing 2, a supply reel and a take-up reel are arranged for winding magnetic tape thereon. The tape cassette 1 further includes a lid 5 which is also moulded of synthetic resin and which includes a pair of ears 7a and 7b directed rearward from the opposite ends of a front portion 8. Pins 6a and 6b are formed integrally with the ears 7a and 7b, respectively, and project toward each other from those parallel ears. These pins 6a and 6b are rotatably supported in apertures of the side wall of the cassette casing 2, whereby the lid 5 is rotatably mounted in the cassette casing 2. The front portion 8 of the lid 5 depends from the edge of an elongated top portion 9 of that lid, and the lid 5 is elastically urged to rotate so as to close the front opening of the cassette casing 2.

Figure 2:
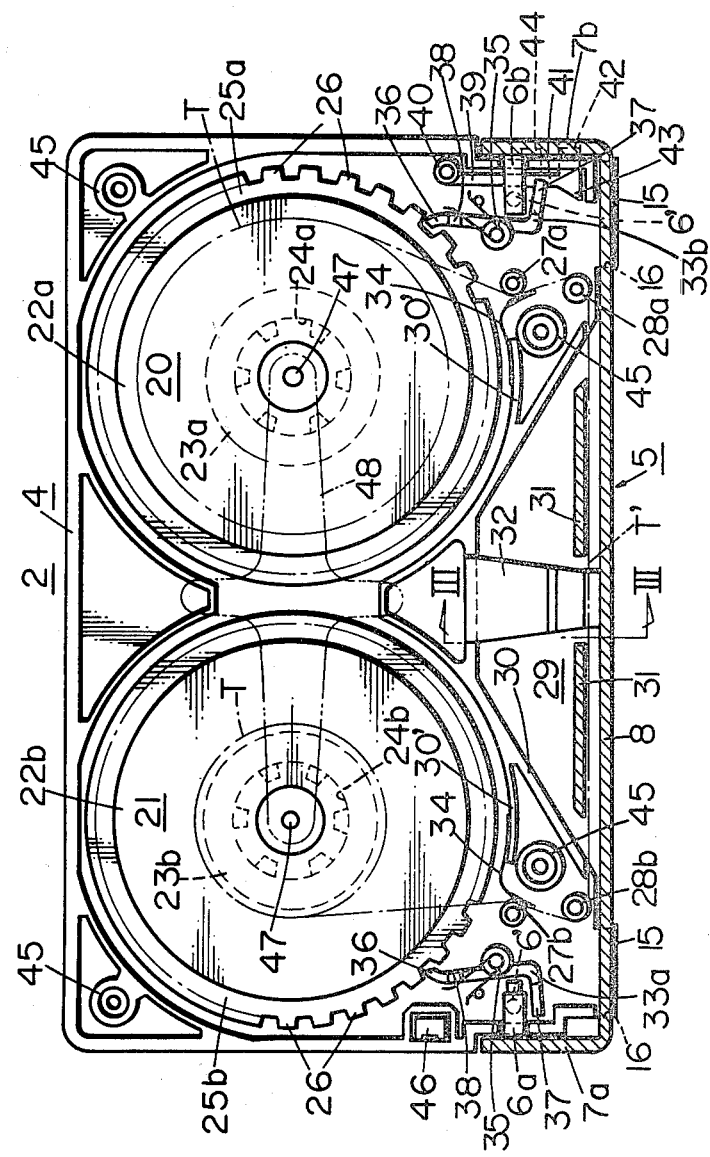
FIG. 2 is a plan view of the tape cassette shown in FIG. 1, the upper half section of the casing being taken off, and a pair of conventional brake levers being arranged therein.

Four bosses 45 are integrally formed with the lower half section 4 of the cassette casing 2, as shown in FIG. 2. The top surfaces of the bosses 45 are spot-faced and through holes are formed in the bosses 45. Against the bosses 45, four corresponding projections with respective threaded holes are formed on the upper half section 3. The bosses 45 and the projections are abutted against each other and are connected by screws, whereby the upper half section 3 and the lower half section 4 are coupled to form the cassette casing 2. A frangible tab 46 is formed at the side wall of the lower half section 4 of the cassette casing 2. When the frangible tab 46 is taken off, inadvertent erasing of the signals recorded on the magnetic tape is prevented.

Guide grooves 10a and 10b are formed in the outer surfaces of the relatively short side walls of cassette casing 2 and extend in the adjacent ears 7a and 7b of the lid 5 when the latter is in its closed position. Further, the undersurface of the bottom wall of the cassette casing 2 is formed with a guide groove 11 extending parallel to the long open side of the cassette casing 2. These guide grooves 10a, 10b and 11 constitute means for guiding the tape cassette 1 during its insertion into a cassette holder of the cassette loading mechanism of a V.T.R. That is, guide ridges or rails of the cassette holder are led into the grooves 10a and 10b when the cassette 1 is inserted into the holder in the direction shown by arrow X in FIG. 1, and a guide ridge of the cassette holder is led into the groove 11 when the cassette 1 is inserted into the holder in the direction shown by arrow Y in FIG. 1.

Figure 3:
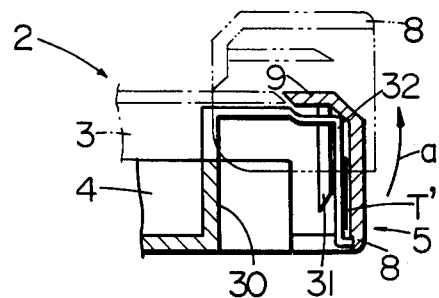
FIG. 3 is a cross-sectional view taken along the line III—III in FIG. 2.

The lid 5 is opened by a lid opening means which rotates the former in the direction shown by arrow a in FIG. 1 and FIG. 3 when the tape cassette 1 is held in the cassette holder of the V.T.R., causing the magnetic tape extended on the front opening of the cassette 1 is exposed. The lid 5, which to be urged in the closed direction, is normally locked by a lock lever arranged inside the cassette casing 2 to prevent the inadvertent opening of the lid 5 when the tape cassette 1 is not used. That is, the lock lever is arranged at the right corner of the front side in the cassette casing 2. Corresponding to the lock lever, a pair of cut-out portions 12 and 13 are formed in the front surface and side surface of the cassette casing 2, respectively, to receive a lock releasing member. The lock releasing member is led into the cut-out portions 12 or 13 to displace the lock lever into an inactive position, allowing the lid 5 to be opened. A rectangular opening 14 is formed on the ear 7b of the lid 5. This opening 14 engages with a lock portion of the lock lever. A pair of recesses 16 are formed at both ends of the lower edge of the lid 5, and the recesses 16 receive respective projections 15 formed on the front side of the lower half section 4 of the tape casete 1.

Figure 4:
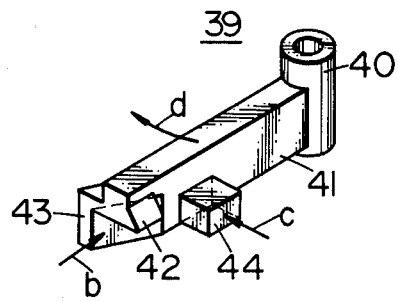
FIG. 4 is a perspective view of a lock lever used to lock the lid of the tape cassette.

One example of the above mentioned lock lever, lock lever 39, is shown in FIG. 4. The lever 39 is moulded of synthetic resin and is pivoted at the right corner of the front side in the cassette casing 2. The lever includes a cylindrical portion 40, by which the lever is pivotally supported, and an arm 41 extending from the cylindrical portion 40. At the top of the arm 41, a locking projection 42 is formed. The projection 42 engages with the rectangular opening 14 (FIG. 1) to lock the lid 5. Further, the arm 41 has a slanted portion 43 and a rectangular parallelopiped projection 44. When the tape cassette 1 is inserted into the cassette holder, the releasing member pushes the slanted projection 43 or the projection 44, as shown in arrow b or arrow c, respectively, in FIG. 5, to rotate the lever 39 clockwise against an urging torsion spring. As a result, the locking projection 42 is disengaged from the opening 14 and the the lid 5 is unlocked.

The tape cassette 1 further includes a round transparent window 17 on the upper half section 3 to allow the viewing of the magnetic tape wound on the supply reel. The round window 17 has an opaque mask 17' at its center. Beside the window 17, a rectangular recess 18 is formed wherein a label 19 can be attached.

Next, there will be described the inner structure of the tape cassette 1 with reference to FIG. 2 wherein the upper half section 3 is taken off and the lid 5 is cross-sectioned. As shown in FIG. 2, a pair of reels 20 and 21 are arranged in the cassette casing 2, separated from each other by a predetermined distance. The supply reel 20 includes an upper flange 22a, a reel hub 23a and a lower flange 25a. Similarly, the take up reel 21 includes an upper flange 22b, a reel hub 23b and a lower flange 25b. A magnetic tape T, shown by chain-dot line in FIG. 2, is wound on the reel hubs 23a and 23b. Hollow portions 24a and 24b are formed at the centers of the reel hubs 23a and 23b, respectively, to receive respective reel drive shafts. Rectangular teeth 26 are formed at the marginal portions of the lower flanges 25a and 25b. The magnetic tape T supplied from the reel 20 is conventionally guided by guide members 27a and 28a to the inside of the front portion of the lid 5, and then the tape T is guided by guide members 28b and 27b and is led to the take-up reel 21. Further, in the conventional tape cassette 1, a pair of resilient tape-slack preventing members 34 are arranged in the cassette casing 2. The members 34 are made of resilient synthetic resin and the tops of the members 34 push the tape T against the peripheral surfaces of the guide members 27a and 27b to prevent the tape T from being slacked. The bottoms of the members 34 are attached to ribs 30' which are connected with separating walls 30.

The top ends of the above mentioned hollow portions 24a and 24b are closed, and the tops of the hubs 23a and 23b are projected over the top surfaces of the upper flanges 22a and 22b. Steel balls 47 are arranged at the top of the hubs 23a and 23b. The steel balls 47 constitute the bearing members of the reels 20 and 21 when the reels are rotated and the magnetic tape runs. The steel balls 47 are held by a cross-shaped leaf spring 48 made of stainless steel. The leaf spring 48 is sustained on the inner surface of the upper half section 3 of the cassette casing 2 as shown by chain-dot line in FIG. 2.

The magnetic tape T' extended between the guide members 28a and 28b is exposed to the outside of the cassette when the lid 5 is opened as mentioned above. When the tape T' is so exposed, a tape loading member (not shown) can be inserted between it and the center of the cassette to access the tape for the reading or recording of information. To accomplish the insertion of the loading member, a mountain-shaped hollow portion 29 is defined at the front end of the lower half section 4, and the hollow portion 29 is separated from the inside portion of the cassette casing 2 by the separating walls 30. A protecting plate 31 is integrally formed with the top portion 9 of the lid 5, as shown in FIG. 3. The protecting plate 31 is positioned at the front side of the hollow portion 29 and is parallel to the front portion 8 of the lid 5. Further, the projecting plate 31 is divided into two portions, and a free end of a holding member 32, integrally formed with the separating wall 30, is positioned between the two portions of the plate 31.

The conventional tape cassette 1 includes a pair of brake levers 33a and 33b for engaging with the rectangular teeth 26 of the reels 20 and 21. The levers 33a and 33b are pivoted at the left and right corners, respectively, of the front side in the cassette casing 2, and the levers 33a and 33b are controlled by actuating projections 6' formed integrally with the pivot pins 6a and 6b of the lid 5. That is, the tops of the levers 33a and 33b engage with the rectangular teeth 26 of the reels 20 and 21 to prevent the reels 20 and 21 from rotating, because the actuating projections 6' do not actuate the levers 33a and 33b when the lid 5 is closed. But, when the lid 5 is opened, the actuating projections 6' push the levers 33a and 33b, and the lever 33a rotates counter-clockwise and the lever 33b rotates clockwise, as shown in FIG. 2, against urging forces of respective torsion springs to disengage the levers 33a and 33b from the teeth 26 of their respective reels.

Figure 5:
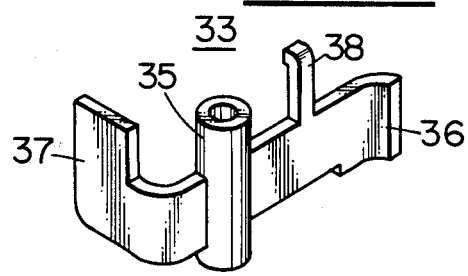
FIG. 5 is a perspective view of the conventional brake lever.

The brake lever 33 is shown in FIG. 5. The lever 33 is moulded of synthetic resin and includes a cylindrical portion 35, which is pivoted within the cassette casing 2. An engaging portion 36 and a contacting projection 37 extend from the cylindrical portion 35, and further a hook portion 38 is integrally formed on the engaging portion 36. The lever 33 shown in FIG. 5 corresponds to the lever 33a in FIG. 2, and the lever 33b is symmetric with the lever 33a as shown in FIG. 2.

As can be seen from the structure described above, the conventional tape cassette 1 requires many parts, and hence it is rather troublesome to assemble, especially since the tape cassette 1 includes a pair of guide members 27a and 27b and a pair of brake levers 33a and 33b which are arranged at both the corners of the front side of the cassette casing 2 and which are closely positioned to each other.

According to the present invention, the guide member and the brake lever are integrated. Hence the number of parts are minimized and it is easier to assemble the tape cassette 1.

Figure 6:
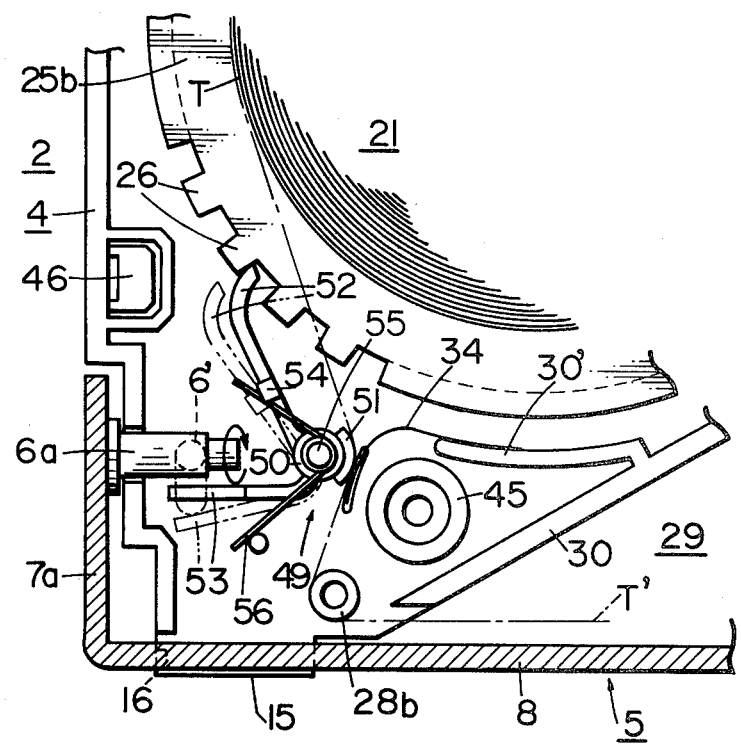
FIG. 6 is a partial plan view of a tape cassette according to a first embodiment of this invention.
Figure 7:
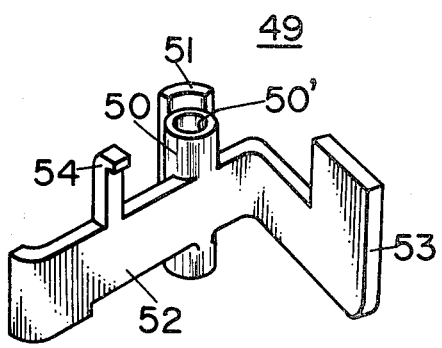
FIG. 7 is a perspective view of a brake lever of the tape cassette shown in FIG. 6.

Now a first embodiment of this invention will be described with reference to FIG. 6 and FIG. 7. FIG. 6 shows a left corner portion of the front side of a tape cassette according to the first embodiment of this invention. In FIG. 6, elements corresponding to those in the previously described conventional tape cassette are denoted by the same reference numerals, and the description thereof is omitted. The tape cassette includes a novel brake lever 49 which is pivotally mounted at or near the position corresponding to the position where the above mentioned conventional guide member 27b is located. The brake lever 49 has a sleeve portion 50 to receive a pivot pin, and the peripheral surface of the sleeve portion constitutes a guide member. The brake lever 49 is made of moulded synthetic resin, and an arc-shaped guide portion 51 is integrally formed on the peripheral surface of the cylindrical sleeve portion 50, as shown in FIG. 7. Further, an engaging portion 52 and a contacting portion 53 extend outward from the sleeve portion 50. The engaging projection 52 and the contacting portion 53 correspond respectively to the engaging portion 36 and the contacting portion 37 of the conventional brake lever 33 shown in FIG. 5. The engaging portion 52 has a projection 54, which one end of an urging spring 56 engages. The guide portion 51 extends over the top end of the sleeve portion 50 wherein an axial through hole 50' is defined.

A pivot pin 55 is formed on the bottom wall of the lower half section 4 of the cassette casing 2, and the pin 55 is received in the through hole 50' of the lever 49, so that the lever 49 is rotatably mounted on the cassette casing 2. Further, the lever 49 is urged clockwise, as shown in FIG. 6, around the pin 55 by the torsion spring 56 which is mounted around the pin 55 and one end of which engages with the projection 54. As a result, the top of the engaging portion 52 of the lever 49 engages with the teeth 26 of the reel 21, and the contacting portion 53 faces the actuating projection 6' formed on the pin 6 of the lid 5. The actuating projection 6' pushes the contacting portion 53 of the lever 49 to rotate the latter counter-clockwise, as shown in a chain-dot line in FIG. 6. Thereby, the engaging portion 52 is disengaged from the teeth 26 of the reel 21, causing that reel to become free.

Further, the guide portion 51 of the sleeve portion 50 is positioned on the tape running path, and the guide portion 51 contacts with the tape-slack preventing member 34 through the magnetic tape T. Accordingly, the running tape T is pinched between the preventing member 34 and the guide portion 51, and the tape T is prevented from being slakened. An assembly which is symmetrically similiar to the lever 49 shown in FIG. 6 is arranged beside the supply reel 20.

As mentioned above, according to this embodiment, the conventional tape guide members 27a and 27b become unnecessary, and hence the number of the parts of the tape cassette and the complexity of assembling it are reduced.

Next, there will be described a second embodiment of this invention. When the lid 5 of the tape cassette 1 is opened in response to the insertion of the cassette 1 into a cassette holder, the supply reel 20 and the take-up reel 21 become free, permitting the magnetic tape to run therein and to be withdrawn by the loading member. But the tape T is apt to be slakened when the tape cassette 1 is ejected from the V.T.R., allowing the magnetic tape T to be injured when the lid 5 is closed. Further, the slackened tape causes other troubles. In the above mentioned conventional tape cassette 1, the tape T is pinched between the tape-slack preventing members 34 and the guide members 27a and 27b to prevent the tape from being slackened. But this merely tends to prevent further slackening of the tape T, and it does nothing to eliminate slackness in the tape T which may already exist, such as that which may be caused by the operation of the loading member.

The second embodiment of this invention is directed to a tape cassette that effectively eliminates such looseness of the magnetic tape. The looseness of the tape is eliminated in response to the displacement of the same brake lever which prevents the reels from rotating inadvertently when the tape cassette 1 is not used.

Figure 8:
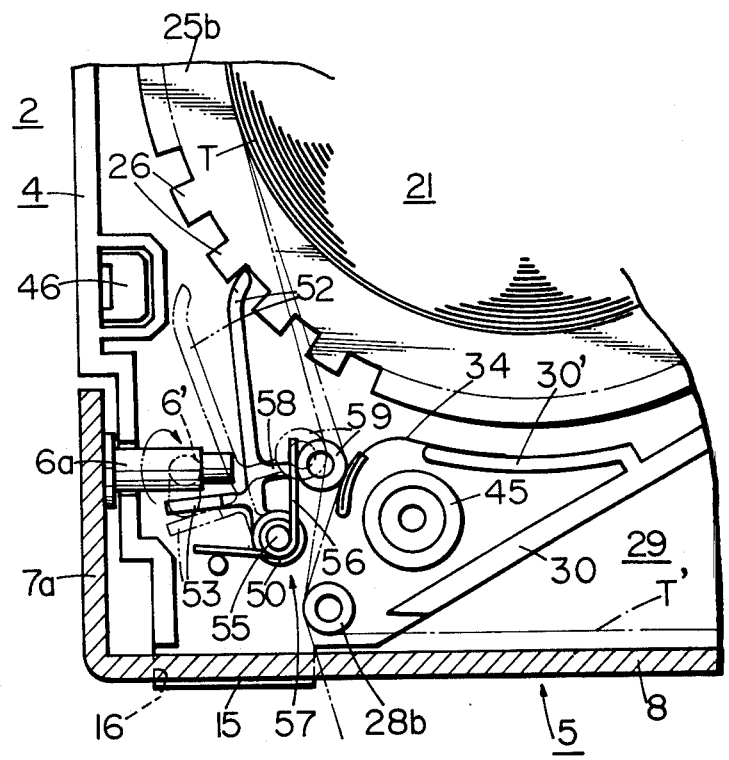
FIG. 8 is a partial plan view of a tape cassette according to a second embodiment of this invention.
Figure 9:
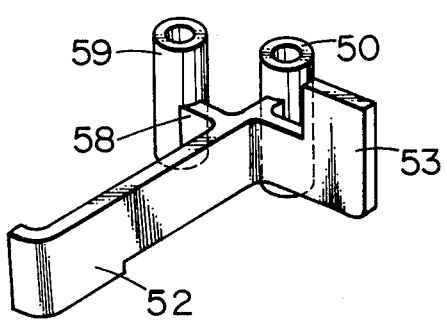
FIG. 9 is a perspective view of a brake lever of the tape cassette shown in FIG. 8.

FIG. 8 shows a tape cassette according to the second embodiment of this invention. In FIG. 8, elements corresponding to those in the previously described conventional tape cassette or the tape cassette according to the first embodiment are denoted by the same reference numerals, and the description thereof is omitted. The tape cassette 1 includes a brake lever 57 which is moulded of synthetic resin. A cylindrical sleeve portion 50 of the brake lever 57 is fitted around a pivot pin 55 mounted on the lower half section 4 of the cassette casing 2, causing the brake lever 57 to be rotatably mounted. The lever 57 has an engaging portion 52 and a contacting portion 53, the former extending radially from the sleeve 50 and the latter extending from a base end of the former, as shown in FIG. 9. The engaging portion 52 engages with the teeth 26 of the reel 21, as shown in FIG. 8, to prevent the latter from rotating. The contacting portion 53 is pushed by the actuating projection 6' to rotate the lever 57 when the lid 5 is opened. Further, the lever 57 has a tape guide portion 59, in the shape of a cylindrical sleeve, which is connected with the engaging portion 52 through a connecting arm 58 as shown in FIG. 9. Thus the tape guide portion 59 is at a distance from the pivotal axis of the lever 57 of which it is part. The guide portion 59 takes a position which corresponds to that of the conventional guide member 27b when the lid 5 is closed, and the guide portion 59 is displaced as shown in a broken line in FIG. 8 when the lid 5 is opened and the tape cassette is in an operative position. The lever 57 is urged clockwise, as seen in in FIG. 8, by a torsion spring 56.

As mentioned above, the tape T runs on the tape path shown by two-dot dash line in FIG. 8 because the brake lever 57 is rotated counter-clockwise, as seen in in FIG. 8, by the actuating projection 6' of the lid 5. As a result, the wrap angle of the tape T relative to the tape guide portion 59 or the guide member 28b becomes small when the V.T.R. is in the recording mode or the reproducing mode, and hence the friction between the tape T and the guide portion 59 or guide member 28b is decreased. Therefore, the tape T runs more smoothly. This is a secondary benefit of this embodiment. Because the tape-slack preventing member 34 is made of resilient material, the member 34 follows the displacement of the brake lever 57, keeping the tape T pinched against the tape guide portion 59 regardless of the rotation of that brake lever.

After the unloading operation of the V.T.R., the tape cassette 1 is ejected from the cassette holder, and then the lid 5 is closed as mentioned above. The brake lever 57 rotates to the original position shown in solid line in FIG. 8 during the earlier half of the closing of the lid 5. The looseness of the tape T is perfectly eliminated by the rotational displacement of the brake lever 57, because the length of the tape path shown by dot-dash line in FIG. 8 is longer than that shown by two dot-dash line in FIG. 8. The engaging portion 52 of the lever 57 engages with the teeth 26 of the reel 21 to prevent the reel 21 from rotating. A similiar assembly is arranged beside the supply reel 20, so that the tape T drawn out of the reel 20 is also tensioned and the looseness of the tape T is eliminated.

Figure 10:
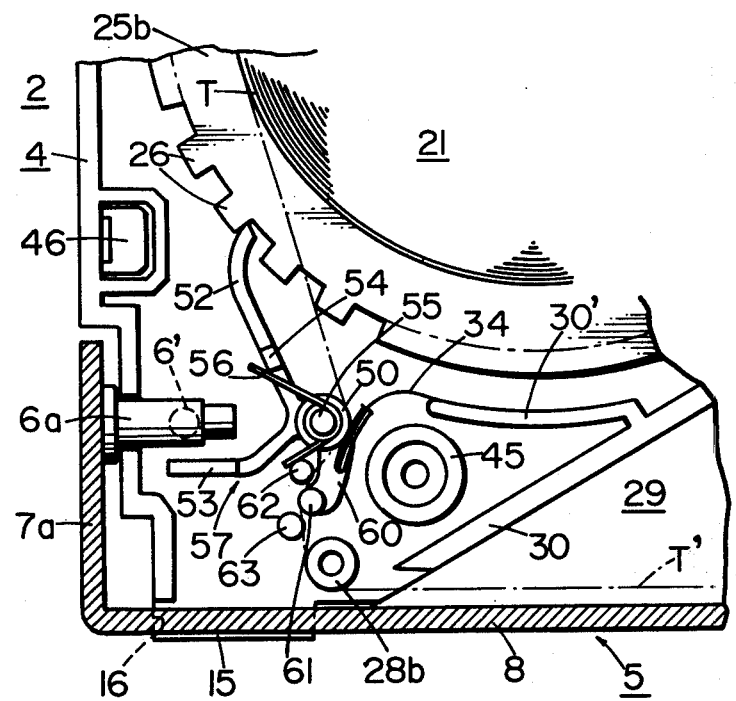
FIG. 10 is a partial plan view of a tape cassette according to a third embodiment of this invention.
Figure 11:
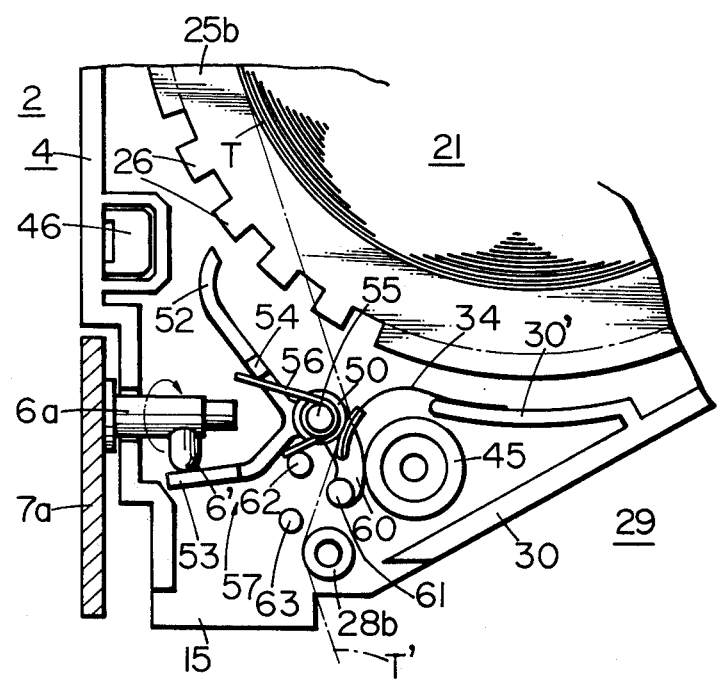
FIG. 11 is a partial plan view of the tape cassette shown in FIG. 10 when the tape cassette is settled in the V.T.R.

Next, there will be described a third embodiment of this invention with reference to FIG. 10 and FIG. 11. In FIG. 10 and FIG. 11, elements corresponding to those in the previously described tape cassette of to the second embodiment are denoted by the same reference numerals, and the description thereof is omitted.

In this embodiment, the brake lever 57 is supported through the cylindrical sleeve portion 50 at the position which corresponds to the position on which the conventional guide member 27b (FIG. 2) is mounted. The engaging portion 52 and the contacting portion 53 are project out from the cylindrical sleeve 50. Further, an arm 60 is integrally formed on the sleeve 50, the arm 60 extending toward the guide member 28b. A tape guide pin 61 is integrally mounted at the top of the arm 60. A pair of guide members 62 and 63 are mounted on the bottom wall of the lower half section 4. The members 62 and 63 are positioned on both sides of the pin 61 when the lid 5 is closed and the brake lever 57 engages with the teeth 26 of reel 21. The magnetic tape T is guided by the sleeve portion 50 and the guide member 28b, and the tape path between the sleeve portion 50 and the guide member 28b is altered in response to the opening of the lid 5. The tape-slack preventing member 34 pinches the tape T against the sleeve portion 50.

When the tape cassette 1 is settled in the V.T.R., the tape T contacts the sleeve portion 50 and the guide member 28b, but does not contact the guide pin 61 and the guide members 62 and 63 as shown in FIG. 11. On the other hand, the tape T does contact the pin 61 and the guide members 62 and 63 when the tape cassette 1 is demounted from the V.T.R., as shown in FIG. 10. The length of the tape path between the sleeve portion 50 and the guide member 28b is longer in FIG. 10 than in FIG. 11. As a result, the looseness of the tape T is eliminated by the rotational displacement of the brake lever 57 when the cassette is removed from the VTR.

As has been shown above, the present invention eliminates undesirable looseness of the tape T and it reduces both the number of the parts required to build and hence the complexity of building, tape cassettes.

Although illustrative embodiments of this invention have been described in detail herein with reference to the accompanying drawings, it is to be understood that the invention is not limited to those precise embodiments, and that various changes and further modifications may be made therein by one skilled in the art without departing from the scope or spirit of this invention as defined in the appended claims.

What is claimed is:

1. In a tape cassette including a cassette casing, at least one tape reel disposed inside said cassette casing, a length of tape wound on said tape reel, an opening formed in said cassette casing, at least two tape guide members, one arranged on each side of said opening for guiding said length of tape in a tape path which extends along said opening, and a brake member engagable with said tape reel to prevent said tape reel from rotating when said tape cassette is not in use; at least one of said tape guide members and said brake member being formed integrally as one body.

2. A tape cassette according to claim 1, wherein said brake member comprises a rotatably mounted brake lever including a cylindrical sleeve portion which functions as said tape guide member.

3. A tape cassette according to claim 1, wherein said one body is moulded of synthetic resin.

4. A tape cassette according to claim 2, wherein said sleeve portion is fitted with a pivot pin to rotatably mount said brake lever.

5. A tape cassette according to claim 2, wherein an arc-shaped guide portion is further formed on the peripheral surface of said sleeve portion to guide said tape.

6. A tape cassette according to claim 2, further comprising a lid mounted so as to conceal said tape in said opening from the outside of said cassette casing when said lid is closed and so as to expose said tape in said opening to the outside of said cassette casing when said lid is opened, and an actuating means which is moved in response to the opening of said lid, wherein said tape reel includes a reel flange having teeth formed on a maginal portion thereof, and wherein said brake lever further includes an engaging portion which engages said teeth to prevent rotation of said tape reel, and a contacting portion pushed by said actuating means when said lid is opened.

7. A tape cassette according to claim 1, wherein said brake member comprises a rotatably mounted brake lever, and wherein said tape guide member is formed on said brake lever at a distance from the pivotal axis of said brake lever so that the length of the tape path is altered in accordance with the rotational displacement of said brake lever.

8. A tape cassette according to claim 7, wherein said tape guide member comprises a cylindrical sleeve portion which is connected integrally with said brake lever through a connecting arm.

9. A tape cassette according to claim 7, wherein said tape guide member comprises a tape guide pin which is connected integrally with said brake lever through a connecting arm.

10. A tape cassette according to claim 7, wherein said tape guide member is positioned between a pair of fixed guide members mounted on said cassette casing when said brake lever is in engagement with said tape reel, so that the tape path is increased at such time.

11. A tape cassette according to claim 7, wherein said brake member comprises a second tape guide member formed on said brake lever, said second tape guide member including a cylindrical sleeve portion which is fitted with a pivot pin to mount said brake lever rotatably.

* * * * *